United States Patent
Greenleaf et al.

[19]

[11] Patent Number: 5,903,516
[45] Date of Patent: May 11, 1999

[54] ACOUSTIC FORCE GENERATOR FOR DETECTION, IMAGING AND INFORMATION TRANSMISSION USING THE BEAT SIGNAL OF MULTIPLE INTERSECTING SONIC BEAMS

[75] Inventors: James F. Greenleaf; Mostafa Fatemi-Booshehri, both of Rochester, Minn.

[73] Assignee: Mayo Foundation for Medical Education and Research, Rochester, Minn.

[21] Appl. No.: 08/758,879

[22] Filed: Dec. 2, 1996

Related U.S. Application Data

[XX .
[60] Provisional application No. 60/017,058, May 8, 1996.

[51] Int. Cl.$^6$ ..................................................... G01S 15/34
[52] U.S. Cl. .................................................................... 367/92
[58] Field of Search ............................... 367/92, 94, 103, 367/87; 600/437

[56] References Cited

U.S. PATENT DOCUMENTS

| | | | |
|---|---|---|---|
| 3,612,211 | 10/1971 | Clark, III | 367/92 |
| 4,253,166 | 2/1981 | Johnson | 367/102 |
| 4,596,007 | 6/1986 | Grall et al. | 367/92 |
| 4,929,951 | 5/1990 | Small | 342/179 |
| 5,022,757 | 6/1991 | Modell | 356/318 |
| 5,402,393 | 3/1995 | Konrad | 367/89 |

OTHER PUBLICATIONS

Acoustic Radiation Pressure In A Three–Dimensional Lossy Medium, J. Acoust. Soc. AM. 100 (2), Pt. 1, Aug. 1996, pp. 741747, Jiang, et al.

Imaging Of Acoustical Nonlinear Parameters and Its Medical and Industrial Applications: A Viewpoint As Generalized Percussion, Acoustical Imaging, vol. 20, 1993, pp. 9–18, Sato, et al.

Tissue Hardness Measurement Using The RA of Focused Ultrasound, 1990 Ultrasonics Symposium, pp. 1377–1380, Sugimoto, et al.

Calculation of Acoustic Radiation Force Generated by Focused Beams Using the Ray Acoustics Approval, J. Acoust. Soc. Am. 97 (5), Pt. 1, May 1995, pp. 2747, 2750, Junro Wu.

The Acoustic Radiation Force, Am. J. Phys. 52 (5), May 1984, pp. 402–408, G.R. Tor.

*Ultrasonic Exposimetry*, 1993 by CRC Press, Inc. Chapter 5, pp. 127–142, Klaus Beissner.

*Primary Examiner*—Ian J. Lobo
*Attorney, Agent, or Firm*—Quarles & Brady, LLP

[57] ABSTRACT

A force is produced within an object by two intersecting ultrasonic beams. The frequency of this force is equal to the beat frequency of the two intersecting beams when their frequencies are made different, or the force may vary as a function of a baseband audio signal f(t) that is used to modulate one of the two beams. The sonic waves produced at the intersection of the two beams can be used to detect the presence of objects or to image objects based on their mechanical properties, or to regenerate desired audio signals at the intersection.

27 Claims, 4 Drawing Sheets

ACOUSTIC FORCE GENERATOR FOR DETECTION, IMAGING AND INFORMATION TRANSMISSION USING THE BEAT SIGNAL OF MULTIPLE INTERSECTING SONIC BEAMS

RELATED APPLICATION

This application is based upon provisional application Ser. No. 60/017,058 filed on May 8, 1996. +gi This invention was made with U.S. Government support awarded by the National Institute of Health (NIH) Grant No. CA 43920. The Government has certain rights in this invention.

BACKGROUND OF THE INVENTION

The field of the invention is the detection and imaging of objects using acoustic beams.

In the field of medical imaging there are a number of modes in which ultrasound can be used to produce images of objects within a patient. The ultrasound transmitter may be placed on one side of the object and the sound transmitted through the object to the ultrasound receiver placed on the other side ("transmission" mode). With transmission mode methods, an image may be produced in which the brightness of each image pixel is a function of the amplitude of the ultrasound that reaches the receiver ("attenuation mode"), or the brightness of each pixel is a function of the time required for the sound to reach the receiver ("time-of-flight" or "speed of sound" mode). In the alternative, the receiver may be positioned on the same side of the object as the transmitter and an image may be produced in which the brightness of each pixel is a function of the amplitude of the ultrasound reflected from the object back to the receiver ("reflection", "backscatter" or "echo" mode). In another mode of operation ("Doppler" mode) the movement of the object is detected and imaged by measuring the phase of the ultrasound reflected from the object back to the receiver.

In all of these medical imaging applications ultrasonic waves are transmitted and ultrasonic waves are received. The higher sonic frequencies enable precise beams to be formed in both the transmit and receive modes. Ultrasonic transducers for medical applications are constructed from one or more piezoelectric elements sandwiched between a pair of electrodes. Such piezoelectric elements are typically constructed of lead zirconate titanate (PZT), polyvinylidene diflouride (PVDF), or PZT ceramic/polymer composite. The electrodes are connected to a voltage source, and when a voltage waveform is applied, the piezoelectric elements change in size at a frequency corresponding to that of the applied voltage. When a voltage waveform is applied, the piezoelectric elements emits an ultrasonic wave into the media to which it is coupled at the frequencies contained in the excitation waveform. Conversely, when an ultrasonic wave strikes the piezoelectric element, the element produces a corresponding voltage across its electrodes. A number of such ultrasonic transducer constructions are disclosed in U.S. Pat. Nos. 4,217,684; 4,425,525; 4,441,503; 4,470,305 and 4,569,231.

When used for ultrasonic imaging, the transducer typically has a number of piezoelectric elements arranged in an array and driven with separate voltages (apodizing). By controlling the time delay (or phase) and amplitude of the applied voltages, the ultrasonic waves produced by the piezoelectric elements (transmission mode) combine to produce a net ultrasonic wave that travels along a preferred beam direction and is focused at a selected point along the beam. By controlling the time delay and amplitude of the applied voltages, the beam with its focal point can be moved in a plane to scan the subject. A number of such ultrasonic imaging systems are described in U.S. Pat. Nos. 4,155,258; 4,155,260; 4,154,113; 4,155,259; 4,180,790; 4,470,303; 4,662,223; 4,669,314; 4,809,184; 5,081,995 and 5,492,121.

The acoustic radiation force exerted by an acoustic wave on an object in its path is a universal phenomenon common to all forms of radiated energy. When a beam of light is absorbed or reflected by a surface, a small force is exerted on that surface. The same is true for electromagnetic waves, transverse waves on an elastic string, and surface waves on a liquid. This force is produced by a "radiated pressure" and a complete disclosure of this phenomenon is set forth by G. R. Torr, "The Acoustic Radiation Force", *Am. J. Phys.* 52(5), May 1984.

The measurement of radiation force exerted by sound waves has become important in recent years to determine the power outputs of medical imaging ultrasonic transducers, Beissner, K., "Measurement Techniques In Ultrasonic Exposimetry," eds. M. C. Ziskin and P. A. Lewin, CRC Press, Boca Raton, 1993. The transducer is submerged in a tank of water and the ultrasonic beam is directed towards an absorbing or reflecting target in the tank. An absorbing target may be realized by a slab of natural rubber, or a reflecting target by an air-backed thin metal plate. If the ultrasonic beam is directed horizontally, the force can be determined by suspending the target as a pendulum and measuring its deflection. The measurements are made in water because the characteristic acoustic impedances of water and human soft tissue are similar, thus the measured ultrasonic beam power is virtually equal to the power radiated by the transducer into the human body provided that the effect of tissue loss has been accounted for.

It is generally accepted that the radiation force F exerted on a totally absorbing target by an ultrasonic beam of power P is given by the equation $$F=P/c,$$

where c is the speed of sound in the medium surrounding the target. For normal incidence on a plane reflecting surface the radiation force has twice this value. The speed of sound in water is 1500 m/s, thus the radiation force on an absorbing target in water is about $6.67 \times 10^{-4}$ newtons/watt.

This sonic radiation force has found application in medicine in the field of extracorporeal shock wave lithotripsy. By applying a set of powerful acoustic shock waves at the surface of the patient such that their energies focus on a target inside the patient, objects such as renal or gall-stones can be fragmented. Such lithotripsy systems are described, for example, in Goldstein, A., "Sources of Ultrasonic Exposure," *Ultrasonic Exposimetry*, eds. M. C. Ziskin and P. A. Lewin, CRC Press, Boca Raton, 1993.

Another application which employs an ultrasonic radiation force produced by a transducer is disclosed by Sugimoto et al, "Tissue Hardness Measurement Using The Radiation Force Of Focused Ultrasound", *IEEE Ultrasonics Symposium*, pp. 1377–80, 1990. In this experiment, a pulse of focused ultrasonic radiation is applied to deform the object which is positioned at the focal point of the transducer. The deformation is measured using a separate pulse-echo ultrasonic system and the hardness of the deformed object is measured. Measurements are made based on the rate of object deformation as the acoustic force is continuously applied, or by the rate of relaxation of the deformation after the force is removed.

A similar system is disclosed by T. Sato, et al. "Imaging of Acoustical Nonlinear Parameters and Its Medical and Industrial Applications: A Viewpoint as Generalized Percussion", *Acoustical Imaging*, Vol. 20, pg 9–18, published in 1993 by Plenum Press. In this system a lower frequency wave (350 kHz) is produced to act as a percussion force, and an ultrasonic wave (5 MHz) is used in a pulse echo mode to produce an image of the subject. The percussion force is said to perturb second order nonlinear interactions in tissues, which reveal more structural information than the conventional ultrasonic pulse/echo system alone.

SUMMARY OF THE INVENTION

The present invention is a method and system for producing an acoustic radiation force at a target location by directing multiple high frequency sound beams to intersect at the location. The high frequency sound beams may differ in frequency and the radiation force will vary in amplitude at this difference, or "beat" frequency. In the alternative, one of the high frequency sound beams may be amplitude modulated at a lower, baseband frequency and the radiation force will vary in amplitude at this baseband frequency.

A general object of the invention is to detect or characterize an object based on its mechanical properties. An object at the location of the intersecting beams will respond to the applied acoustic radiation force by producing an acoustic wave that can be detected with a microphone or other detection apparatus. The detected acoustic wave may be used to detect the presence of the object or it may be used to detect and evaluate the mechanical properties of the object.

Another object of the invention is to produce an image of the target object. The intersection point of the high frequency sound beams may be moved to scan the object and signals indicative of the responsive, beat frequency acoustic wave produced at each scanned location may be acquired. The acquired signals are used to produce an image of the object.

Another object of the invention is to project a force into an object to measure the object's mechanical characteristics. The radiation force produced by the intersecting high frequency sound beams produces motion at the intersect location which can be detected and analyzed to measure the mechanical characteristics at that location. Detection can be performed in a number of ways, including Doppler ultrasound and nuclear magnetic resonance imaging.

Yet another object of the invention is to regenerate baseband audio in a remote location. By modulating one of the high frequency sound beams with a baseband audio signal, the radiation force at the beam intersection will vary as a function of the baseband audio signal and a corresponding acoustic wave is produced at the intersect location. By using the highly directional high frequency sound beams, therefore, a non-directional audio wave can be precisely produced at the intersect location.

Another object of the invention is to detect variations in the characteristic of fluids, such as blood. The present invention is very sensitive to changes in the acoustic characteristics of fluids. Changes in fluid temperature, density, chemical composition cause changes in acoustic characteristics which are detected by a change in the amplitude of the beat frequency signal.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Consider an ultrasonic source directing its beam on a large target in water. The radiation force, F, for the plane wave case is commonly written as $$F=KP/c, \quad (1)$$

where P, c, and K are the total time averaged acoustic power, sound speed in water, and a constant, respectively. The value of K for a perfectly absorbing target is 1, and for a perfectly reflecting target it is 2. For a focused beam impinging on a partially reflecting target of arbitrary size, the linear relation of (1) still holds, however, the value of K is different and can be determined as a function of target power reflection coefficient and its size as described by J. Wu, "Calculation of Acoustic Radiation Force Generated by Focused Beams Using the Ray Acoustic Approach," *J. Acoust. Soc. Am.* 97(5), pt. 1, May 1995.

Figure 1:
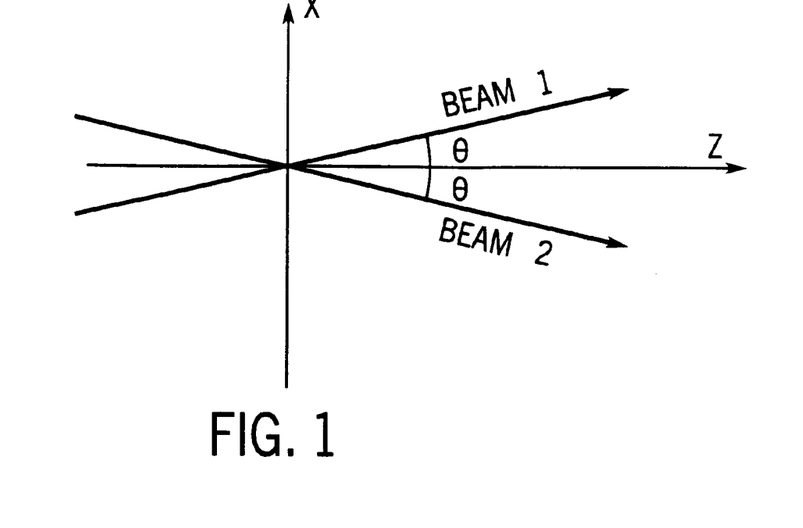
FIG. 1 is a graphic representation of two intersecting sonic beams according to the present invention.

Consider two plane wave beams propagating in two directions on the (x,z) plane, crossing each other at the origin as shown in FIG. 1. To simplify the problem, we assume that these beams have equal amplitude and phase, and propagate at $\theta$ and $-\theta$ angles with respect to the z-axis. Also, we assume that both profiles on the z=0 plane are identical and equal to g(x,y). The resultant field on the z=0 plane may be written as $$s(t)=g(x,y)[\cos(\omega_1 t - k_1 x \sin\theta)+\cos(\omega_2 t + k_2 x \sin\theta)], \quad (2)$$

where $k_1=\omega_1/c$ and $k_2=\omega_2/c$. Assuming $\Delta\omega=\omega_1-\omega_2<<\omega_1,\omega_2$, then it can be shown that the acoustic power has slow variations at the "beat" frequency $\Delta\omega$ about its long time average. Denoting this beat frequency component by $P_1(t,x,y)$, we can write $$P_1(t,x,y)=g^2(x,y)\cos[\Delta\omega t-(k_1+k_2)x\sin\theta]. \quad (3)$$

Now consider a planar target on the z=0 plane. Referring to Eq. (1), the normal component of radiation force exerted on this target by $P_1(t,x,y)$ may be found by the following integration:

$$F_1(t) = \frac{K}{c} \int\int P_1(t, x, y) dx dy. \quad (4)$$

The result of this integration is a sinusoidal function of time at the beat frequency $\Delta\omega$. This beat force vibrates the target, resulting in a new pressure field at this frequency, which can be received. The received signal r(t), may be written as $$r(t) = k'\cos(\Delta\omega t + \psi), \quad (5)$$

where k' and ψ are constants whose values depend on size, power reflection coefficient, and the other mechanical parameters of the target, such as mass and damping factor, that determine its response to a given force at a particular frequency. In addition to the above, these constants are functions of receiver parameters.

Figure 2:
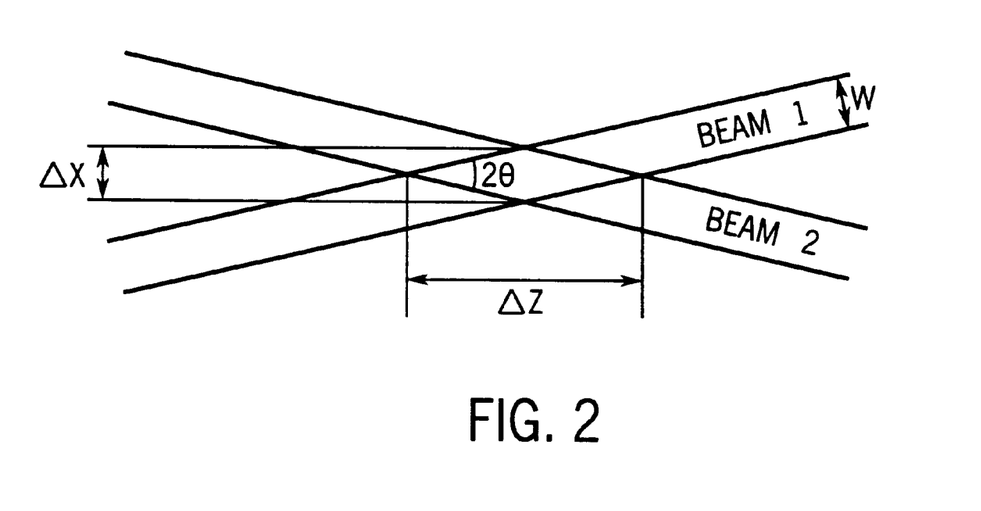
FIG. 2 is a graphic representation of the region in which the beat signal is produced by the intersecting sonic beams illustrated in FIG. 1.

Referring particularly to FIG. 2, a two-transducer assembly is employed that produces two focused beams of beamwidth w that intersect about their focal points at an angle 2θ. The above plane wave approximation applies because the interaction region is limited to the focal area. The resolution of the system may be defined as the interaction area where the two beams overlap. In this example, Δx and Δz represent the lateral and axial resolutions, respectively. Assuming identical beamwidths, w, the resolution can be written $\Delta x = \omega/\cos\theta$, and $\Delta z = \omega/\sin\theta$. These values are full-width at quarter-maximum (FWQM) estimates because w is defined on a full-width at half-maximum (FWHM) basis.

Within the interaction area the beat force indicated by Eq. (4) will be applied to the object. The manner in which the object responds to this force will, of course, depend on its mechanical characteristics. As the embodiments of the invention described below will indicate, there are many uses for this invention which stem from its ability to accurately project a low frequency acoustic force to a defined area.

The response of an object to the radiation force may be explained by considering a simplified, one-dimensional equation of motion for the mass-spring model. In this model, we assume a mass m is held by a spring having a "stiffness constant" of μ. We also assume that motion of this mass is damped by friction or by other mechanisms represented by the "resistance constant" $R_m$. Now consider a sinusoidal force $F_1(t) = A\cos\Delta\omega t$ being applied to this mass. As described by P. M. Morse and K. V. Ingard, "Theoretical Acoustics," McGraw Hill, 1968, the steady-state motion of the mass due to this force can be written as:

$$x(t) = A\cos(\Delta\omega t + \phi)/\Delta\omega|Z_m|$$

where $$Z_m = R_m - j(\Delta\omega m - \mu/\Delta\omega)$$

is the mechanical impedance, and $$\tan\phi = (\Delta\omega m - \mu/\Delta\omega)/R_m$$

Thus the amplitude and phase of the displacement of the mass are determined by the mechanical properties m, $R_m$ and μ. At its resonant frequency, where $\Delta\omega = \sqrt{\mu/m}$, the amplitude of the motion reaches its maximum value.

DESCRIPTION OF THE PREFERRED EMBODIMENT

Figure 3:
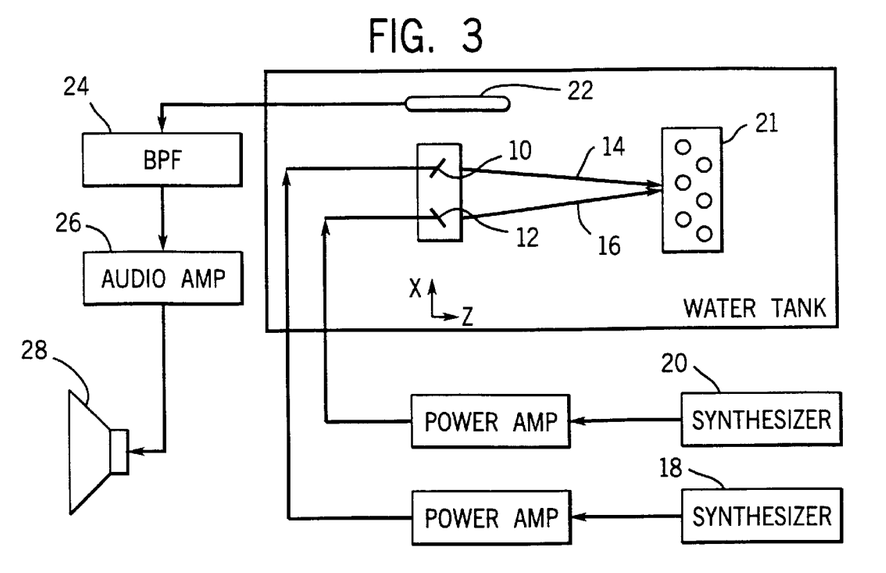
FIG. 3 is a block diagram of a first embodiment of the invention used to detect the presence of an object according to the present invention.

Referring particularly to FIG. 3, a first embodiment of the invention is used to detect the presence of an object based upon the acoustic wave produced by the object in response to the applied beat force. This detector system includes a pair of ultrasonic transducers 10 and 12 which produce two focused beams 14 and 16 of beamwidth w=2 mm that cross each other at their focal points. The transducers 10 and 12 are driven by respective continuous wave synthesizers 18 and 20 at ultrasonic frequencies $\omega_1 = 2\pi \times 3,500,000$ rad./sec. and $\omega_2 = 2\pi \times 3,493,525$ rad./sec. that differ by a beat frequency $\Delta\omega = 2\pi \times 6,475$ rad./sec..

The acoustic field produced by the object 21 in response to the beat force produced by the intersecting beams 14 and 16 is received by a hydrophone 22. The received beat signal is applied through a band-pass filter 24 to an audio amplifier 26. The band-pass filter 24 has a narrow pass band centered on the beat frequency $\Delta\omega$ to reject noise and any reflected ultrasonic signals. The amplified audio signal may be applied to a loudspeaker 28 or an earphone to provide the operator with an indication of the amplitude of the acoustic wave produced by the object. The transducers 10 and 12 can be moved physically to scan the object 21, or in the alternative the beams 14 and 16 can be steered electronically to scan the object 21.

One medical application of this embodiment of the invention is to detect atherosclerosis. This disease is characterized by the buildup of plaque in the arteries which can eventually block them. The plaque is comprised of muscle cells and lipids such as cholesterol which are infiltrated by fibroblasts. Eventually, calcium is deposited in the plaque, decreasing elasticity of the artery and making the arterial wall hard. It has been discovered that such a hard arterial wall produces a significantly greater acoustic wave response than a healthy arterial wall when subjected to a beat force of approximately 7,000 hertz. The diseased artery can thus be detected as a significant increase in the audible sound produced by the speaker 28.

Another application of this embodiment of the invention is a gas bubble detection system. Gas bubbles in fluids present a high impedance discontinuity. Hence, a strong radiation force can be generated on them when they are exposed to the beat force. Application of this device includes detection of gas bubbles in the blood stream, for example, in carotid arteries of divers. The two-transducer assembly can be mounted on the diver's skin aiming at the carotid artery. If a gas bubble crosses the beam intersection region, it will produce substantial sonic waves at the beat frequency. This signal can alarm the diver because it can be heard directly, or the signal can be picked up by a microphone for monitoring purposes.

Another method for using the first embodiment measures contrast agent concentration in the blood stream. Contrast agents are liquids filled with micro-bubbles, conventionally injected in the blood vessels to enhance the contrast of echo-cardiograms. By measuring the concentration of the contrast agent at various points along a vessel, it is possible to determine the blood flow and its variations. This method employs two, or more, two-beam systems of the type shown in FIG. 3, which are placed at two or more locations along a blood vessel. A bolus of contrast agent is injected in the vessel at a point near the first two-beam assembly. The concentration is measured at all points by measuring the amplitude of the sonic beat signal as the bolus of contrast agent passes by in the blood stream. A dye curve can thus be obtained by plotting the differential concentration at each point.

Yet another application of this embodiment of the invention is the detection of changes in the characteristics of fluids. For example, the beams 14 and 15 may be directed to intersect in the lumen of a blood vessel and a microphone placed to pick up the beat frequency sonic wave. It has been discovered that the amplitude of the resulting beat signal is very sensitive to changes in the acoustic characteristics of the fluid. Change in fluid density and fluid temperature may be detected, in addition to other characteristics which affect acoustic properties of fluids.

Another application of this embodiment of the invention is object position measurement. It can be shown that the phase of the signal received by the hydrophone is proportional to the distance of the object from the ultrasound source. Hence, by measuring the relative phase of the received signal at different beam positions, variations in the object positions can be measured. This can be used for example to measure the surface roughness of an object. In this case, the surface variations within the axial resolution of the system, $\Delta z$, can be estimated using known phase measurement methods, including the quadrature detection method.

Another application of this embodiment of the invention is object motion and velocity measurement. It can be shown that the phase of the signal received by the hydrophone is proportional to the distance of the object from the ultrasound source. Hence by measuring the variations of the relative phase of the received signal versus time at a fixed beam position, the motion of the object can be detected, and velocity can be measured. A variation of this method is Doppler measurement of the speed. It can be shown that if the object moves towards or away from the ultrasound source, while being insonified, the frequency of the received signal by the hydrophone will shift in proportion to the speed of the object. This well known phenomenon can be used to estimate the speed of the target by measuring the frequency deviation of the received signal.

Another application of this embodiment of the invention is object characterization. It can be shown that the phase of the signal received by the hydrophone is related to the relative mass and speed of the sound in the object relative to the surrounding medium. Hence, by measuring the relative phase of the received signal at different beam positions, relative variations in the object parameters can be detected.

Another application of this embodiment of the invention is speed of sound measurement in the propagation medium. It can be shown that the phase of the signal received by the hydrophone is related to the speed of the sound in the surrounding medium. Hence, given a reference target at a fixed position, relative variations in the speed of sound in the medium between the target and the hydrophone can be estimated. An extension of this method is estimation of the material parameter, such as temperature, whose variations will cause a change in the sound speed of the medium. This method can be used to measure the speed of sound (or other parameters such as temperature) of a stream of liquid passing between the hydrophone and the target.

A second embodiment of the invention is a novel imaging system. Rather than relying on the reflection or attenuation of an ultrasonic wave by the object as is done in ultrasound imagers, the imager of the present invention relies on other mechanical properties of the object. More specifically, an imager according to the present invention exploits the ability of the object to convert the beat force to an acoustic wave that can be detected by the receiver.

Figure 4:
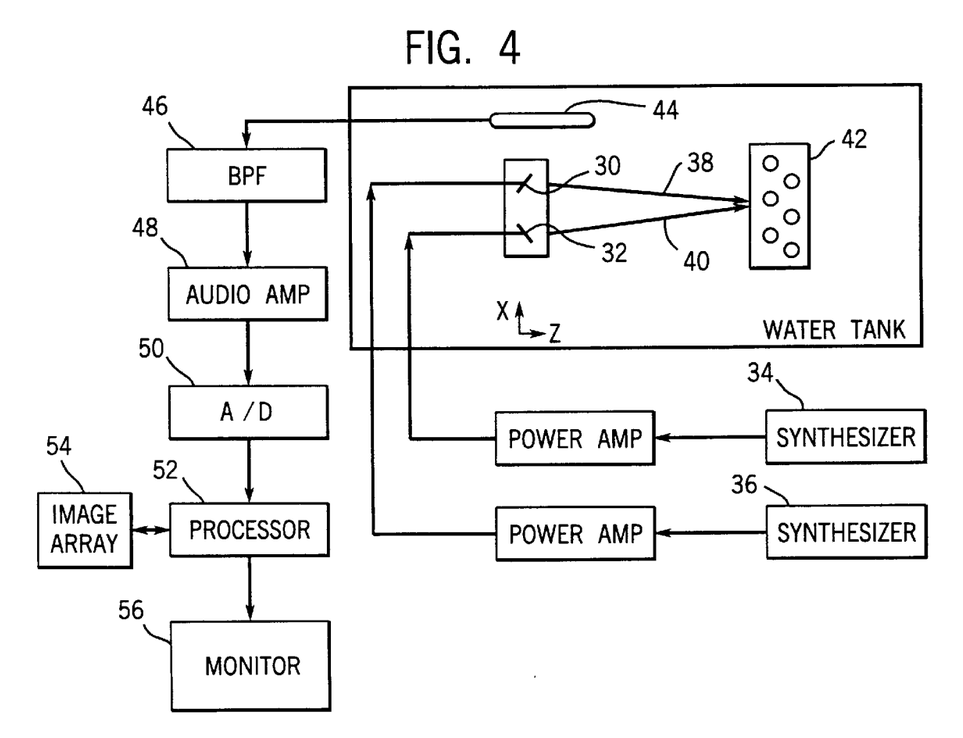
FIG. 4 is a block diagram of a second embodiment of the invention used to image an object according to the present invention.

Referring particularly to FIG. 4, the imaging system includes two focused transducers 30 and 32. Each transducer has a focal region from 6 cm to 13 cm, a beamwidth of w=2 mm (defined as the full-width at half-maximum), and is positioned with respect to the horizontal plane such that $\theta=10.16$ degrees. The beams 30 and 32 cross each other at about their focal points. The transducer 30 is driven by a continuous wave, signal synthesizer 34 at a frequency of $f_1=3,500,000$ Hz and the transducer 32 is driven by an identical synthesizer 36 at a second frequency $f_2=3,493,525$ Hz. The resulting ultrasonic beams 38 and 40 thus produce a beat force in the target object 42 at a frequency $\Delta f=6,475$ Hz.

The 6,475 Hz sonic wave produced by the target object 42 is received by a hydrophone 44 and digitized. The received beat signal is filtered by a band-pass filter 46 centered on the beat frequency, amplified at audio amplifier 48 and digitized by a 12-bit analog-to-digital converter 50 at 100,000 samples/sec. The processor 52 calculates the mean amplitude (or the standard deviation) of 600 samples of the digitized beat signal, then stores this value in the image array 54 at a location corresponding to the beam intersection position. Processor 52 also controls other parts of the system to carry out the scan process. It directs the beams 38 and 40 such that their intersect region raster scans the object 42 in the x-z (or x-y) plane. Beam steering is accomplished either mechanically using two stepper motors (not shown), or by well known phased array techniques. Processor 52 also provides the trigger signals needed to synchronize the scanning and digitization function. The resulting beat signal image produced after a complete raster scan may be enhanced using known image enhancement methods and/or displayed on a monitor 56. A two-dimensional image is thus produced in which the gray scale intensity of each pixel indicates the acoustic level produced by the target 42 at the single beat frequency.

A variation of this two-dimensional imaging system can be used to acquire a three-dimensional image in which two dimensions are spatial (x,z) and the third dimension is beat frequency. In this alternative embodiment, one of the beams 14 or 16 is driven by a slow frequency-varying CW signal. The above equation (5) can be written as $$r(t)=K'\cos(\Delta\omega(t)t+\psi), \qquad (6)$$

where $\Delta\omega(t)$ is the time-varying frequency difference.

This function is chosen to cover a spectrum of desired frequencies. For example, by choosing this as a saw-tooth function, we can linearly sweep a range of beat frequencies from, $\Delta\omega_1$ to $\Delta\omega_2$. The acquired beat signal samples at each x,z beam location are stored at successive frequency bins in the image array 54. The resulting frequency dimension provides the information needed for analyzing the spectrum of the object's acoustic response to mechanical stimulations at different frequencies.

As an example application, one can make use of this method to identify calcification and estimate its thickness and size. Referring to the mass-spring model described above, the amplitude of the motion peaks at the resonant frequency, and this resonant frequency is proportional to $1/\sqrt{m}$. Calcification with different thicknesses have different masses, thus resonating at different frequencies. Hence, when examining different regions of calcification by the variable beat frequency method, one sees peaks at different frequency bins depending on the thickness and size of the calcification.

Figure 4A:
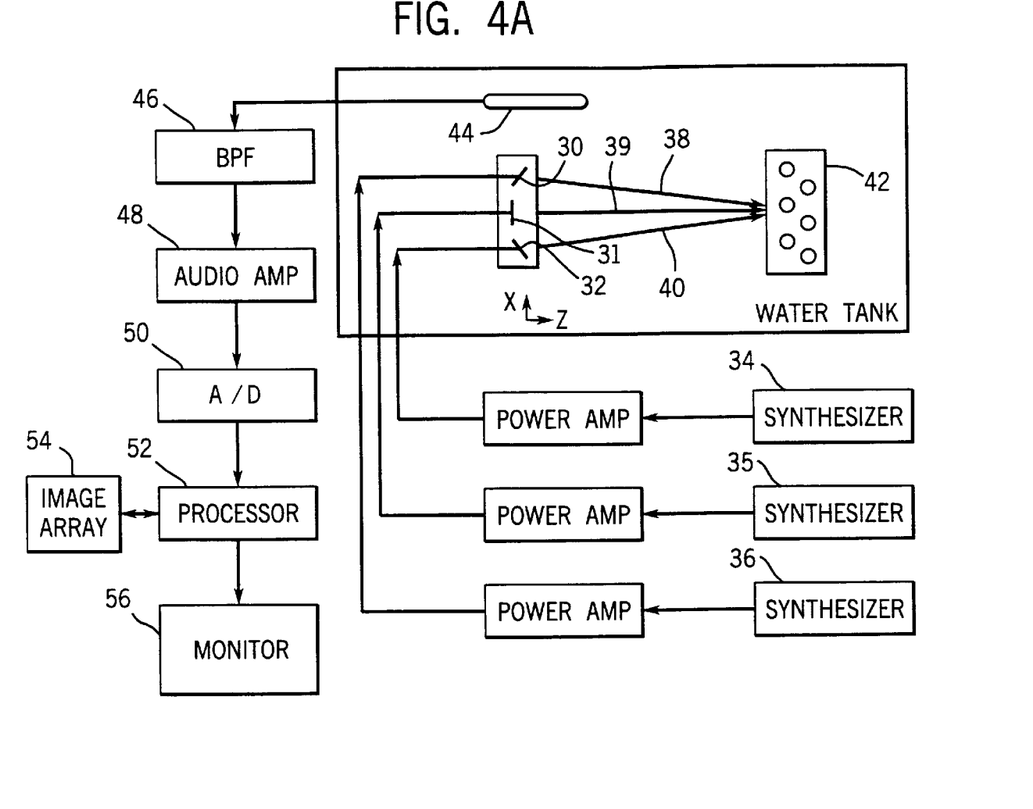
FIG. 4A is a block diagram of a variation of the second embodiment of the invention used to image an object according to the present invention.

Another variation of this second embodiment of the invention is to employ three ultrasonic beams 38, 39 and 40 as shown in FIG. 4A that have three different frequencies $\omega_1$, $\omega_2$ and $\omega_3$. The three beams 38–40 are produced by three ultrasonic transducers 30–32 which are driven by three synthesizers 34–36. The beams 38–40 are controlled to intersect at their focal points to form a composite beam that creates a radiation force on the target 42 at three different beam beat frequencies of $\Delta\omega_1=|\omega_2-\omega_1|$, $\Delta\omega_2=|\omega_3-\omega_2|$, and $\Delta\omega_3=|\omega_1-\omega_3|$. This composite beam scans the object 42 and sonic waves at these three beat frequencies are produced at each scanned location in the object 42. These sonic waves are received by a microphone 44 and applied to a three-channel band pass filter 46. Each channel of the band pass filter is tuned to one of the beat frequencies $\Delta\omega_1$, $\Delta\omega_2$ and $\Delta\omega_3$, and the three resulting filtered signals are amplified at 48 and separately digitized at 50.

Each of the three beat frequency signals is used to reconstruct an image of the target 42, which represents its mechanical response at that particular beat frequency. This is performed by the processor 52 as described above. Hence, three different images are obtained simultaneously. The three images are coded in three different colors, for example three basic colors of red, green, and blue. The final color image is composed by overlaying these three individual one-color images.

A target point can appear in this composite image with different colors, depending on its response at the three beat frequencies. The final image, thus, represents both the structure and the frequency response of the object. An advantage of this method over the previous method (using two beams and sweeping the frequency of one beam), is that a higher data acquisition speed, smaller data size, and simpler processing can be achieved. This is because there is no need for a long frequency sweeping time, nor a need for the resulting spectrum calculations.

Figure 5:
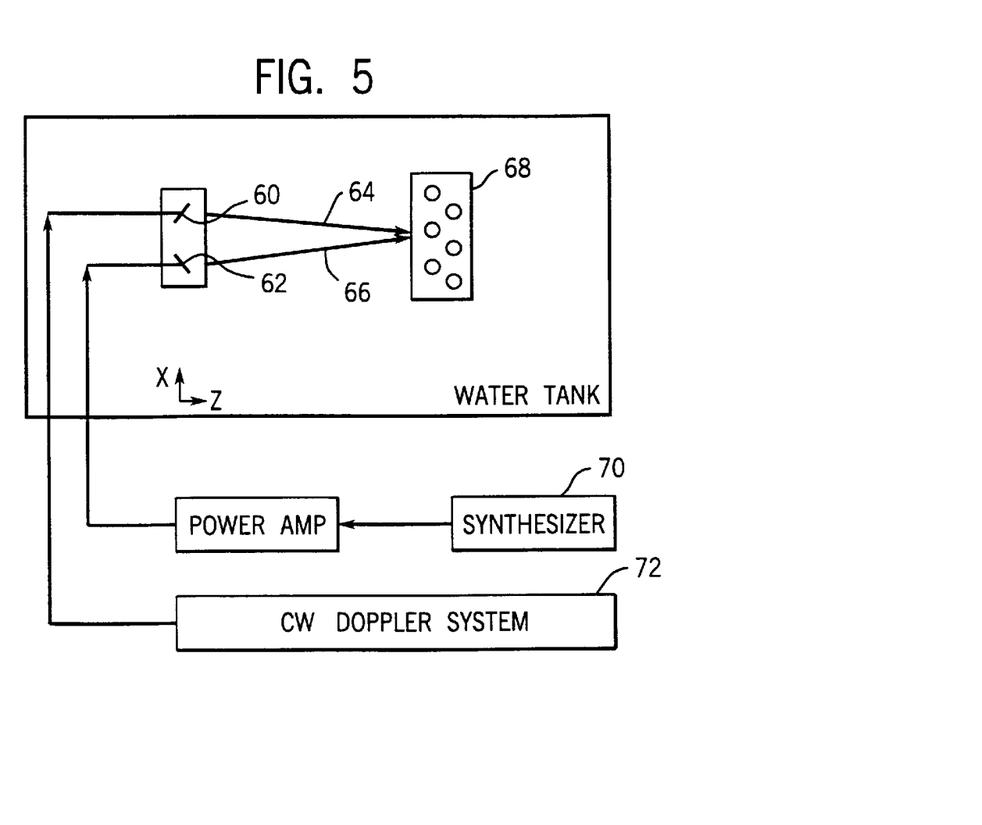
FIG. 5 is a block diagram of a third embodiment of the invention used to measure the physical properties of an object according to the present invention.

A third embodiment of the invention employs a Doppler receiver to sense the target vibration in response to the applied beat force. Referring particularly to FIG. 5, the system includes two ultrasound transducers 60 and 62 that produce beams 64 and 66 at respective frequencies $\omega_1=2\pi\times 2,000,000$ rad./sec. and $\omega_2=2\pi\times 2,006,000$ ad./sec. which intersect at the target object 68. The beams 64 and 66 can be moved mechanically or electronically to scan their intersecting region over the object 68.

The ultrasound transducer 62 is driven by a continuous wave signal at $\omega_2$ produced by a synthesizer 70. On the other hand, the transducer 60 is driven at frequency $\omega_1$ by a CW Doppler system 72 which forms part of a commercially available ultrasound imaging system such as that commercially available from Acuson Company and sold as the Model #128XP computed tomography system. The target object 68 is vibrated by the beat force at the difference frequency $\Delta\omega=\omega_1-\omega_2$, and this vibration is a movement which is detected by the receiver section of the Doppler system 72. As discussed previously, the object vibration, and hence its local velocity, is a function of its mechanical characteristics. Thus the Doppler system 72 is used as a tool for characterizing the target's mechanical properties.

One factor that must be considered in analyzing the Doppler system output, however, is that the frequency $\omega_2$ of the beam 66 is close enough to that ($\omega_1$) of the Doppler system 72 to be interpreted as a Doppler shifted echo signal. This "interfering" signal is at a stationary frequency $\omega_2$, however, and hence it can be readily distinguished from true Doppler shift echo signals which have a broad Doppler spectrum. The interfering signal at frequency $\omega_2$ can be filtered out of the Doppler response.

Other imaging modalities can also be used to measure the motion resulting from the radiation force produced by the present invention. For example, in place of the Doppler system a magnetic resonance imaging ("MRI") system, such as that described in co-pending U.S. patent application Ser. No. 325,834 filed Oct. 19, 1994 and entitled "MR Imaging Of Synchronous Spin Motions And Strain Waves" can be used to image the mechanical characteristics of the scanned object. In this system a motion sensitizing magnetic field gradient on the MRI system is synchronized with the applied radiation force and the resulting motion is precisely indicated by the phase of the acquired NMR signals. As described in this co-pending application which is hereby incorporated herein by reference, nearly all mechanical properties of the imaged object can be measured and used to modulate the intensity of a reconstructed image.

This method can be used to provide a map of tissue stiffness which is an excellent tool to detect deep tumors.

A fourth embodiment of the invention serves an entirely different function than those described above. Rather than obtaining an indication of the presence or nature of a target object, in the fourth embodiment of the invention information is transferred to the target object in the form of acoustical energy. By using ultrasonic beams which can be finely focused and directed, this transfer of information can be precisely targeted.

If we consider two ultrasonic beams of frequency $\omega_0$ and one of the beams is amplitude modulated by a baseband signal f(t) at a modulation index m, equation (2) above for the resultant field is rewritten as follows:

$$s(t)=g(x,y)[\cos(\omega_0 t-k_0 x\sin\theta)+mf(t)\cos(\omega_0 t+k_0 x\sin\theta)] \qquad (7)$$

where $k_0=\omega_0/c$, $|m|<1$ is a constant, and f(t) is the desired baseband signal whose bandwidth is much less than $\omega_0$. It can be shown that the acoustic power has slow variations about its long time average. Denoting this low frequency component by $P_1(t,x,y)$, we write $$P_1(t, x, y) = \frac{1}{2}g^2(x, y)[m^2 f^2(t) + 2mBf(t)], \qquad (8)$$

where $B=\cos(2k_0 x\sin\theta)$ and $B\approx 1$ for small values of $\theta$.

For small m and $\theta$, $P_1(t,x,y)$ can be approximated as:

$$P_1(t,x,y)\approx g^2(x,y)Mbf(t). \qquad (9)$$

Now consider a planar target on the z=0 plane. Referring to the above Eq. (1), the radiation force exerted on this target by $P_1(t,x,y)$ may be found by integration:

$$F_1(t) = \frac{K}{c}\int\int P_1(t, x, y)dx dy. \qquad (10)$$

The result of this integration is a force proportional to f(t). This time-varying component of the force vibrates the target, resulting in a new pressure field that regenerates the baseband signal f(t). The regenerated audio signal, r(t), may be written as $$r(t)=K'mf(t), \qquad (11)$$

where K' is a constant whose value depends on size, power reflection coefficient, and other mechanical properties of the target, such as mass and damping factor, that determine its response to a given force at a particular frequency.

Figure 6:
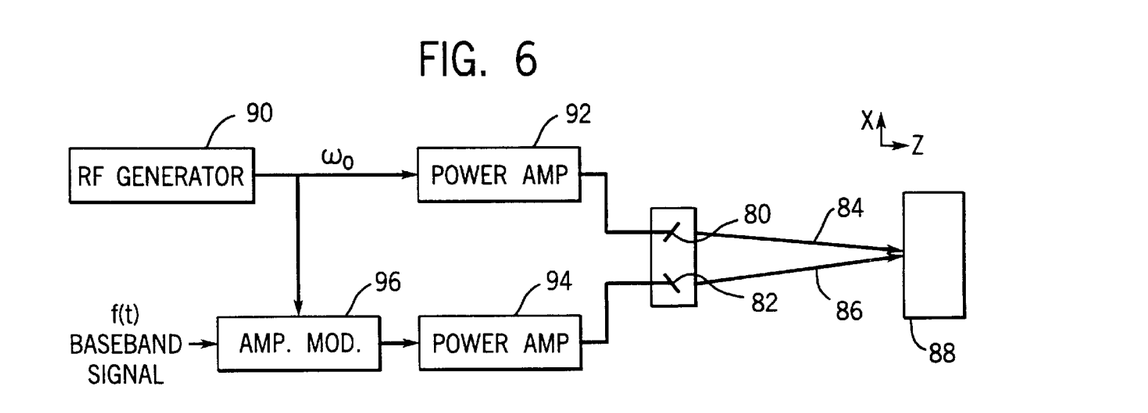
FIG. 6 is a block diagram of a fourth embodiment of the invention used to convey a signal acoustically to a distant target object according to the present invention.

Referring particularly to FIG. 6, the audio regeneration system which employs the present invention includes two ultrasound transducers 80 and 82 that produce respective beams 84 and 86 that intersect at a target object 88. They have a focal length and a beamwidth (defined as the full-width at half-maximum), positioned on the horizontal plane.

The beams 84 and 86 intersect at about their focal points. Both transducers 80 and 82 are driven by a common RF generator 90 at a carrier frequency $\omega_0=2\pi\times3,500,000$ rads/sec. The continuous wave driven signal is applied through a power amplifier 92 directly to the transducer 80, whereas the transducer 82 is driven through a power amplifier 94 and an amplitude modulator 96. The baseband signal f(t) is input to the modulator 96 and it functions to modulate the amplitude of the high frequency carrier signal $\omega_0$ that drives the transducer 82.

The two ultrasonic beams 84 and 86 interact at their intersection in the target object 88. This interaction causes the target object 88 to vibrate in response to the baseband signal f(t). The beams 84 and 86 can be made very directive using small transducers 80 and 82, because the wavelength of the ultrasound beams at frequency $\omega_0$ is very small compared to that of the baseband signal f(t). The target 88 acts as the converter of the high frequency ultrasound energy to the baseband frequency energy and the frequency response can be made very flat because the bandwidth of the baseband signal f(t) is very small relative to the ultrasound frequency $\omega_0$.

One medical application of this fourth embodiment of the invention is a hearing aid. The two transducers 80 and 82 are positioned along side the user's temple and the intersection of their ultrasonic beams is directed to structures in the inner ear. The baseband signal f(t) is the ambient sound picked up by a microphone and amplified. This ambient sound is reproduced in the inner ear by vibrating structures in the inner ear. The eardrum and the middle ear are completely by-passed by this sound regeneration system, and patients with hearing loss due to problems in these structures can be helped.

We claim:

1. A detector system for indicating the presence of an object, the combination comprising:
   a first sonic beam producer for producing a sonic beam at a first high frequency $\omega_1$ which is directed at the object;
   a second sonic beam producer for producing a sonic beam at a second high frequency $\omega_2$ which is directed at the object and which intersects the first sonic beam at a location in the object to produce a force therein which varies at a beat frequency equal to $\omega_1-\omega_2$;
   a detector for receiving a sonic wave produced by the object at beat frequency $\omega_1-\omega_2$; and
   means coupled to the detector for indicating the presence of the object in response to the received sonic wave.

2. The detector system as recited in claim 1 in which the beat frequency $\omega_1-\omega_2$ is within the audible hearing range of humans and the detector indicates its presence by producing an audible sound.

3. The detector system as recited in claim 1 in which the frequency of one of said sonic beams is swept through a range of frequencies such that the beat frequency of the sonic wave is also swept through a range of frequencies.

4. The detector system as recited in claim 1 in which the object is located within a human subject and the first and second sonic beam producers and the detector are located outside the human subject.

5. The detector system as recited in claim 4 in which the object is an artery and the amplitude of the received sonic wave indicates the hardness of the artery.

6. The detector system as recited in claim 1 which includes means for moving the first and second sonic beams to scan their intersection location over a region in the object; in which the means for indicating the presence of the object produces a beat signal indicative of the amplitude of the sonic wave; and which includes a display for receiving the beat signal and producing an image indicative of the amplitude of the sonic wave emanating from locations in said region.

7. The detector system as recited in claim 6 in which the object is located within a human subject and the imaging system is located outside the human subject.

8. The detector system as recited in claim 6 in which the frequency of one of said sonic beams is changed over a range of values as the intersection point scans the region to be imaged, and the detector receives the sonic waves produced at the corresponding beat frequencies and produces corresponding beat signals.

9. The detector system as recited in claim 6 which includes a third sonic beam producer for producing a sonic beam at a third high frequency $\omega_3$ which is directed at the object to be imaged and which intersects the first and second sonic beams at the location in the object, and in which the means for moving the first and second sonic beams to scan the region also moves the third sonic beam.

10. The detector system as recited in claim 9 in which the detector also receives sonic waves at the beat frequencies $|\omega_2-\omega_3|$ and $|\omega_1-\omega_3|$ and produces corresponding second and third beat signals.

11. The detector system as recited in claim 10 in which the display receives the three separate beat signals and produces three corresponding images.

12. The detector system as recited in claim 11 in which each of the three images has a different color from the other of the three images.

13. The detector system as recited in claim 1 which includes a third sonic beam producer for producing a sonic beam at a third high frequency $\omega_3$ which is directed at the object and which intersects the first and second sonic beams at the location in the object, and in which the detector also receives sonic waves produced at beat frequencies of $|\omega_2-\omega_3|$ and $|\omega_1-\omega_3|$.

14. A detector system for indicating the mechanical characteristics of an object, the combination comprising:
   a first sonic beam producer for producing a sonic beam at a first high frequency ($\omega_1$) which is directed at the object;
   a second sonic beam producer for producing a sonic beam at a second high frequency ($\omega_2$) which is directed at the object and which intersects the first sonic beam at a location in the object to produce a force therein which varies at a beat frequency equal to the difference between said first and second high frequencies ($\omega_1-\omega_2$); and
   means for detecting motion in the object caused by the beat frequency force.

15. The detector system as recited in claim 14 in which the means for detecting is an ultrasonic Doppler system.

16. The detector system as recited in claim 14 in which the means for detecting is a nuclear magnetic resonance system.

17. The detector system as recited in claim 14 in which the frequency of one of said sonic beams is swept through a range of frequencies such that the beat frequency of the sonic wave is also swept through a range of frequencies.

18. The detector system as recited in claim 14 in which the object is located within a human subject and the first and second sonic beam producers and the means for detecting are located outside the human subject.

19. The detector system as recited in claim 14 which includes a third sonic beam producer for producing a sonic beam at a third high frequency $\omega_3$ which is directed at the object and which intersects the first and second sonic beams at the location, and the force produced in the object also varies at beat frequencies equal to the difference between the second and third high frequencies $|\omega_2-\omega_3|$ and the difference between the first and third high frequencies $|\omega_1-\omega_3|$.

20. A method for detecting changes in the characteristics of a fluid, the steps comprising:

producing a first sonic beam at a first high frequency ($\omega_1$) which is directed into the fluid;

producing a second sonic beam at a second high frequency ($\omega_2$) which is directed into the fluid and which intersects the first sonic beam at a location therein to produce a force therein which varies at a beat frequency equal to $\omega_1-a_2$;

receiving a sonic wave produced in the fluid at beat frequency ($\omega_1-\omega_2$) and producing a beat signal; and evaluating the beat signal to detect changes in the characteristics of the fluid.

21. A detector system for indicating a characteristic of an object, the combination comprising:

a first sonic beam producer for producing a focused sonic beam at a first high frequency $\omega_1$ which is directed at the object;

a second sonic beam producer for producing a focused sonic beam at a second high frequency $\omega_2$ which is directed at the object and which intersects the first focused sonic beam at a location in the object to produce a force therein which varies at a beat frequency equal to $\omega_1-a_2$; and a detector for receiving a sonic wave produced at said location in the object at beat frequency $\omega_1-\omega_2$ and the detector having means for indicating a characteristic of the object in response to the received sonic wave.

22. The detector system as recited in claim 21 in which the beat frequency $\omega_1-\omega_2$ is within the audible hearing range of humans and the detector indicates the characteristic by producing an audible sound.

23. The detector system as recited in claim 21 in which the frequency of one of said focused sonic beams is swept through a range of frequencies such that the beat frequency of the sonic wave is also swept through a range of frequencies.

24. The detector system as recited in claim 21 in which the object is located within a human subject and the first and second sonic beam producers and the detector are located outside the human subject.

25. The detector system as recited in claim 21 in which the intersection of the two focused sonic beams occurs at their respective focal points.

26. The detector system as recited in claim 25 which includes means for moving the focal points of the two focused sonic beams such that said location is moved to scan the object.

27. The detector system as recited in claim 26 in which the means for indicating a characteristic of the object produces an image.

* * * * *